US008296375B1

(12) United States Patent
Katzer et al.

(10) Patent No.: US 8,296,375 B1
(45) Date of Patent: Oct. 23, 2012

(54) PARALLEL MANAGEMENT OF LOAD SERVERS, CACHE SERVERS, AND FEED SERVERS

(75) Inventors: Robin D. Katzer, Olathe, KS (US); Sei Y. Ng, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 666 days.

(21) Appl. No.: 12/365,170

(22) Filed: Feb. 3, 2009

(51) Int. Cl.
*G06F 15/16* (2006.01)
(52) U.S. Cl. .................. 709/206; 709/203; 709/227
(58) Field of Classification Search .......... 709/206, 709/203, 227
See application file for complete search history.

(56) References Cited

U.S. PATENT DOCUMENTS

| | | | |
|---|---|---|---|
| 7,533,188 B1 | 5/2009 | Greger | |
| 7,653,689 B1* | 1/2010 | Champagne et al. | 709/206 |
| 7,984,300 B2 | 7/2011 | Fredlund et al. | |
| 2002/0065097 A1 | 5/2002 | Brockenbrough et al. | |
| 2003/0004998 A1 | 1/2003 | Datta | |
| 2003/0140092 A1 | 7/2003 | Caruso et al. | |
| 2005/0210128 A1 | 9/2005 | Cannon et al. | |
| 2006/0224943 A1* | 10/2006 | Snyder et al. | 715/501.1 |
| 2008/0091773 A1 | 4/2008 | Hameen-Anttila | |

OTHER PUBLICATIONS

First Action Interview Pre-Interview Communication dated Apr. 27, 2012, U.S. Appl. No. 12/498,496, filed Jul. 7, 2009.
Williams, Anthony, "Reduce Bandwidth Usage by Supporting If-Modified-Since in PHP", Sep. 30, 2007, 5 pgs. http://www.justsoftwaresolutions.co.uk/webdesign/provie-last-modified-headers-and-handle-if-modified-since-in-php.html.
Katzer, Robin D., et al., Patent Application entitled, "Dynamic Scheduling of Electronic Content Updates," filed Jul. 7, 2009, U.S. Appl. No. 12/498,496.
First Action Interview Office Action dated Jun. 11, 2012, U.S. Appl. No. 12/498,496, filed on Jul. 7, 2009.
Notice of Allowance dated Jul. 5, 2012, U.S. Appl. No. 12/498,496, filed on Jul. 7, 2009.

* cited by examiner

*Primary Examiner* — Adnan Mirza (57) ABSTRACT

A system of content delivery is provided. The system comprises cache servers, data loaders, and content feed servers. The cache servers store content. The data loaders communicate with the content cache servers, and each data loader writes updated content to each of the content cache servers. The data loaders schedule the retrieval of the updated content from content sources based on a refresh period. The data loaders arbitrate periodically to prevent duplication of file entries. The content feed servers are in communication with the content cache servers and each of the data loaders. Each feed server receives a request for content from an electronic device and requests the content from one of the content cache servers. When the content cache server replies that the requested content is not available, the feed server sends the request for the content to one of the data loaders.

18 Claims, 5 Drawing Sheets

PARALLEL MANAGEMENT OF LOAD SERVERS, CACHE SERVERS, AND FEED SERVERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many websites contain data that may be updated on a periodic basis to allow internet users to regularly check information and to stay abreast of current events. For example, a sports fan may periodically check a sports page website or a team website to keep up-to-date with scores and statistics. Also, investors may want to keep current with stock quotes and any breaking news in the stock market. Some websites may present information based on user input, for example, a weather website may request input of a zip code before it retrieves the weather forecast for an area. In another example, an airline website may request a flight number before it presents the current flight status.

Although many websites were set up originally with computer and laptop users in mind, the advancements in mobile phones and other mobile electronic devices now allow users of mobile electronic devices to easily access web pages for quick access to dynamic information. Currently, various mobile media companies are available that allow mobile electronic devices to be used as tools for business and entertainment as well as a source for constant access to news and information.

SUMMARY

In an embodiment, a system of content delivery is provided. The system comprises a plurality of content cache servers, a plurality of data loaders, and a plurality of content feed servers. Each of the plurality of content cache servers stores a plurality of current content and sends the requested content, where the current content is substantially the same at each of the cache servers. Each of the plurality of data loaders is in communication with each of the content cache servers where each data loader retrieves an updated content from a content source and writes the updated content to each of the content cache servers. The data loaders schedule the retrieval of the updated content from the content source based on a file entry comprising a refresh period for the content. The data loaders arbitrate periodically to prevent duplication of file entries. Each of the plurality of content feed servers is in communication with each of the content cache servers and each of the data loaders. Each feed server receives a request for content from an electronic device and requests the content from one of the content cache servers. When the content cache server replies that the requested content is not available, the feed server sends the request for the content to one of the data loaders selected based on a round-robin selection process.

In another embodiment, a method of updating content is provided. The method comprises receiving a request to send updated content to an electronic device and requesting the updated content from a cache server, wherein the cache server is one of a plurality of cache servers, each of the cache servers storing substantially the same content. When the requested updated content is not present in the cache server, the method comprises requesting a data load server to fetch the updated content from a content server and then writing the updated content to each of the cache servers. When the requested updated content is not present in the cache server, the method also comprises replying to the electronic device to resend the request later.

In another embodiment, a system of content delivery is provided. The system comprises a plurality of content cache servers, a plurality of data loaders, and a plurality of content feed servers. Each of the plurality of cache servers stores a plurality of current content and sends the requested content, wherein the current content is substantially the same at each of the cache servers. Each of the plurality of data loaders is in communication with each of the content cache servers. Each data loader retrieves an updated content from a content source and writes the updated content to each of the content cache servers. Each of the plurality of content feed servers is in communication with each of the content cache servers and each of the data loaders. Each feed server receives a request for content from an electronic device and requests the content from one of the content cache servers. When the content cache server replies that the requested content is not available, the feed server sends the request for the content to one of the data loaders selected based on a universal reference locator (URL) of the requested content. The feed server also sends a message to the electronic device to resend the request for content later.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A method and system to manage parallel load servers, cache servers and feed servers to update and deliver content is disclosed. In an embodiment, when a large number of mobile electronic devices request access to content, the load may overwhelm the content servers. To alleviate the load, a plurality of feed servers may request the content from a plurality of parallel content cache servers that each store essentially the same information. If the requested content is available in one of the cache servers, the content is sent back through the feed servers to display on the electronic device. If the requested content does not exist in the cache server, the feed server may request the content from one of a plurality of parallel data loaders and send a message to the electronic device to request the content again later. One of the data loaders may then retrieve the content from a content server associated with the website, translate the updated content into an extensible mark-up language (XML) format, and then write the updated content to each of a plurality of cache servers so that it is available the next time it is requested by the electronic device.

The above mentioned content servers may serve a variety of content, for example, current weather conditions, weather forecasts, sports scores, stock quotes, news headlines, airline flight information, and other changing content. The first time in a pre-defined time period that an electronic device requests content, the content may not be available in the cache server. In one embodiment, the feed server may go directly to the content server to obtain the content while the electronic device user waits. Alternatively, the feed server may go to the data loader and synchronously request the content from the data loader. In this case, the feed server waits for the data loader to obtain the content, to reformat the content for display on the electronic device, and to return the reformatted content to the feed server; the feed server then provides the reformatted content to the electronic device. In another embodiment, rather than to tie up the server resources, the feed server may send a message to the electronic device to try again later and asynchronously may send a request for updated content to one of the data loaders.

In an embodiment, when the feed server sends a message to the electronic device to try again later, the message may contain information that may be used by the electronic device to determine when to again request the desired content. This may avoid the electronic device repeatedly requesting an update and unnecessarily consuming network communication resources or system processing resources. For example, the feed server may be informed by the data loader what the update period is for the subject content. Alternatively, the feed server may be informed by the data loader when the subject content may be updated. For example, if the subject content is a current weather conditions content, the data loader may inform the feed server that the requested current weather conditions are updated ever 15 minutes; and the feed server may send a message to the electronic device indicating that the requested current weather conditions is not available and the content updates every 15 minutes. The electronic device may then defer sending a request for the current weather conditions for 15 minutes. Alternatively, the data loader may inform the feed server that the requested current weather conditions is scheduled to be updated in 5 minutes and 23 seconds; and the feed server may send a message to the electronic device indicating that the requested current weather conditions is not available presently but will be available in 5 minutes and 23 seconds. The electronic device may then resend its request for the current weather conditions after 5 minutes and 23 seconds have passed. The data loader may be aware of the update schedule for the various content. For example, the data loader may be aware that current weather conditions update every 15 minutes, that weather forecasts update every hour, and stock quote update every 5 minutes. The data loader may be aware of content update schedules which change depending upon contextual information. For example, professional football scores may update every 15 minutes Saturday through Monday during the professional football season but not update from March through June. For example, stock quotes may update every 5 minutes while the stock market is in session and not update when the stock market is closed.

In an embodiment, the data loader may be chosen by the feed server based on either the universal reference locator (URL) of the content, by using a round-robin selection process, or by another selection process. If the content of the web page changes on a regular basis (e.g., stock prices, weather conditions) and the content is being requested frequently, the data loader may retrieve the content from the content servers and send it to the cache servers at pre-defined time intervals. The data loaders may also schedule the acquisition of data from the content servers so as to prevent the duplication of file entries. If content is no longer requested after a pre-defined period of time, the data loader may stop updating the content to the cache servers until another request is made. In addition, any content that is not being requested may be cleared from the cache servers to free up resources.

Data loaders may be associated with two types of files: a static file and a journal file. In an embodiment, the static file may contain information that does not change based on location or require the input of data (e.g., header information). The journal file contains dynamic data that may require input from the user before information can be presented (e.g. a zip code). The journal files are not parallel nor can they be replicated. When the data loader receives a request for content, a job manager component of the data loader may read the static file and then build the journal entry for the new piece of data, which may include the last time the content was refreshed in the cache server. Then, at the designated time interval, the content can be refreshed. The information in the journal file also can be used as a backup file in the event that the server goes down since it would have a record of what has been refreshed and when it was last updated.

In an embodiment, by using a plurality of parallel cache servers to store and regularly update content from popular content servers and by dividing the load between multiple parallel data loaders, the number of synchronous connections to the content servers is reduced. As a result of alleviating the load on the content servers, the electronic devices may be able to obtain current content more rapidly. In addition, in the event that one of the cache servers goes down, a number of other cache servers may be readily available to provide the same content.

Figure 1:
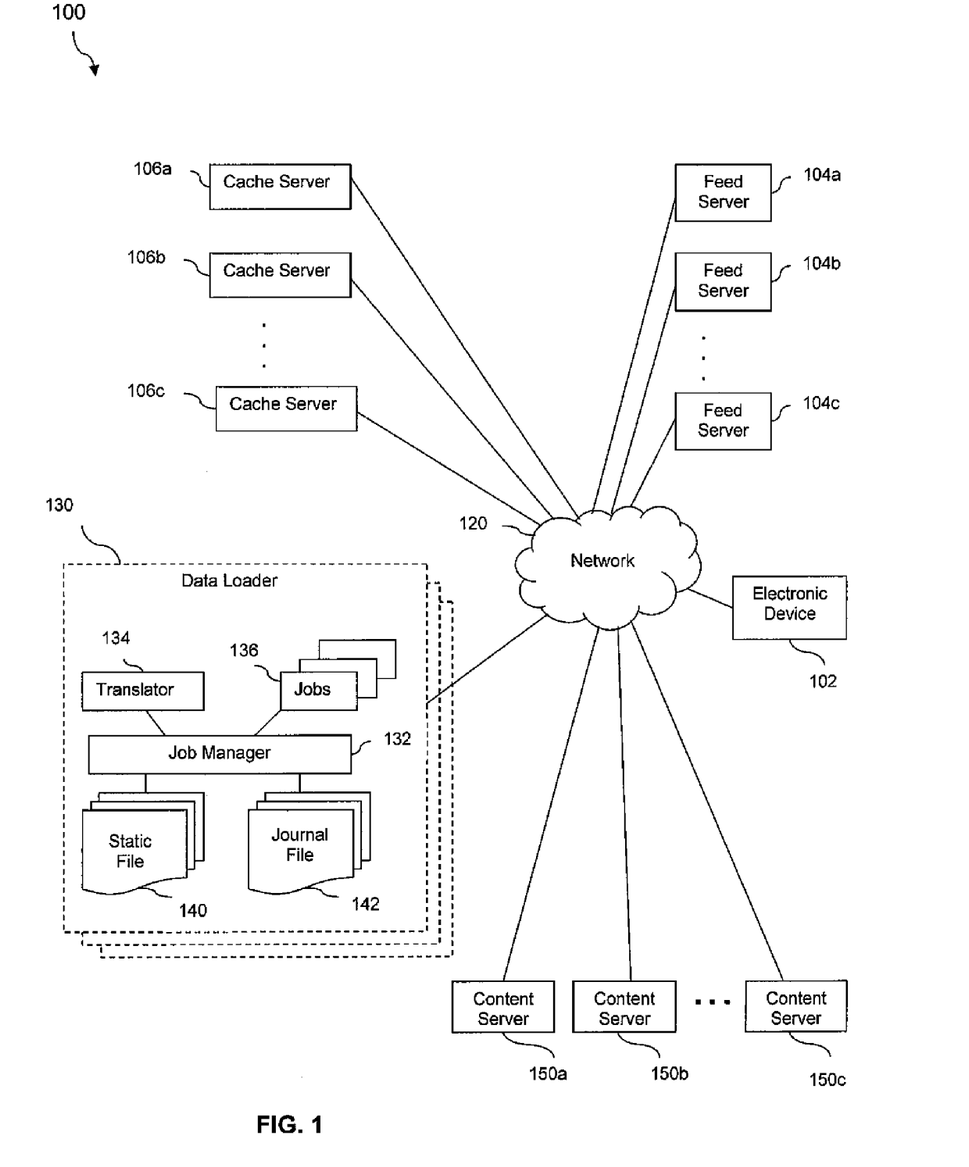
FIG. 1 illustrates a system of content delivery according to an embodiment of the disclosure.

Turning now to FIG. 1, a system 100 for content delivery using parallel management of load servers, cache servers, and feed servers is described. The system 100 comprises an electronic device 102, a plurality of feed servers 104a, 104b, 104c, a plurality of cache servers 106a, 106b, 106c, a network 120, a plurality of content servers 150a, 150b, 150c, and a plurality of data loaders 130 (only one is shown). In an embodiment, the data loader 130 may comprise a job manager 132, a translator 134, a plurality of jobs 136, a static file 140 and a journal file 142. The electronic device 102 may be one of a mobile phone, a personal digital assistant (PDA), and a media player, or other mobile electronic device having wireless communication capability. A mobile phone is discussed in detail hereinafter. The plurality of feed servers 104a, 104b, 104c may use a really simple syndication (RSS) content feed format to publish content. The plurality of cache servers 106a, 106b, 106c may be run in parallel and may each store substantially the same content. The plurality of content servers 150a, 150b, 150c may serve content relating to current information such as weather conditions and forecasts, sports scores and statistics, stock quotes, news headlines, airline flight information, and other content. The data loader 130 may retrieve updated content from the content server 150a, 150b, 150c and may use the translator 134 to translate the content to an extensible mark-up language (XML) format before writing the updated content to the plurality of cache servers 106a, 106b, 106c. The job manager 132 may write data to two types of files: the static file 140 and the journal file 142. The static file may contain information that does not change or require the input of data and the journal file contains dynamic data that may require user input. The job manager 132 may also schedule the jobs 136 to prevent the duplication of file entries. The job manager 132 may be implemented as a computer system. Computers are discussed in detail hereinafter.

In an embodiment, the electronic device 102 may use a web browser or other user interface to make a hypertext transport protocol (HTTP) request to access content through one of the plurality of feed servers 104a, 104b, 104c. The request may be to receive updated content such as a stock quote, a weather report, a sports score, or a news headline. The feed servers 104a, 104b, 104c, then may use a round-robin selection process to request the updated content from one of the plurality of cache servers 106a, 106b, 106c. Each of the plurality of cache servers 106a, 106b, 106c are run in parallel and may store substantially the same content so that it is readily available to multiple users. If one of the cache servers 106a, 106b, 106c goes down, a number of other cache servers would contain the same information so that it can be easily accessed.

When the electronic device 102 requests content, for example a current quote of a stock price, the content may not be available in the cache server 106a, 106b, 106c. In one embodiment, when the cache servers 106a, 106b, 106c do not contain the requested content, the feed server 104a, 104b, 104c may send a message to the electronic device 102 to resend the request for content at a later time. At essentially the same time, the feed server 104a, 104b, 104c may send a request to the data loader 130 to fetch the updated content from one of the plurality of content servers 150a, 150b, 150c and to write the updated content to the plurality of cache servers 106a, 106b, 106c, so that it is available the next time the electronic device 102 requests the content. By requesting that the electronic device 102 resend the request for content at a later time, the number of synchronous connections to the content servers 150a, 150b, 150c may be reduced and the available resources may not be tied up. Synchronous connections among other components of the system 100, for example synchronous connections to feed servers 104 and/or cache servers 106, may be reduced and the burden on other system resources 100 may be reduced. In another embodiment, the feed servers 104a, 104b, 104c may request the content from the data loader 130 and wait for the content to be returned. For example, the feed server 104 may request the content; the data loader 130 may obtain the content from the content server 150, reformat the content in a format suitable for presenting on the electronic device 102, and return the content to the feed server 104; and the feed server 104 may return the content to the electronic device 102. This exchange may be referred to in some contexts as a synchronous content retrieval. In another embodiment, the feed server 104a, 104b, 104c may directly access one of the content servers 150a, 150b, 150c, wait to receive a synchronous reply, and then send the updated content to the electronic device 102.

In an embodiment, when the feed servers 104a, 104b, 104c request updated content from one of the plurality of data loaders 130, it may select the data loader 130 based on the universal reference locator (URL) of the requested content. Each of the plurality of universal reference locators may be associated with an update interval that determines when content is updated from the content servers 150a, 150b, 150c. Alternatively, the feed servers 104a, 104b, 104c may select one of the plurality of data loaders 130 using a round-robin selection process. The data loaders 130 may schedule receiving updated content from the content servers 150a, 150b, 150c based on when the content was last refreshed.

In an embodiment, the job manager 132 may schedule the jobs 136 to retrieve content from any one of the plurality of content servers 150a, 150b, 150c. The job manager 132 may also schedule the jobs 136 based on the refresh period of the content so as to prevent the duplication of the acquisition of data. For example, if the content changes on a regular basis (e.g., stock prices, weather conditions) and the content is being requested frequently, duplicate requests may be combined and put in a queue so that the content is periodically retrieved from the content servers 150a, 150b, 150c and written to the cache servers 106a, 106b, 106c at pre-defined time intervals. In addition, the job manager 132 may also use a queue to schedule the requests so that when one job is completed, the next job is executed, until the queue is cleared. Then, if no request is made for the cache content after a pre-defined period of time, the job manager 132 may stop scheduling the jobs 136 to fetch the content to update the cache servers 106a, 106b, 106c, until another request is made. In addition, any content that is not requested within a pre-defined period of time may be cleared from the cache servers 106a, 106b, 106c. Alternately, content may be automatically cleared from the cache servers 106a, 106b, 106c after a pre-defined amount of time, whether it's been requested or not (e.g., every 24 hours).

In some embodiments, the job manager 132 may write to more than one file within the data loader 130; for example, the static file 140 and the journal file 142. The static file 140 may contain information that does not change based on location or require the input of data (e.g., national news headlines). The journal file 142 may contain dynamic data that changes on a periodic basis and may also require input from the user before information can be presented (e.g., a zip code may be required for a weather forecast). When the data loader 130 receives a request for content, the job manager 132 reads the static file 140 (e.g., header information) and then writes a unique journal entry for the new piece of data (e.g., weather forecast), which may include the last time the content was refreshed in the cache server 106. Then, at the designated time interval, the content can be refreshed. Each journal file 142 is unique (i.e., not replicated or parallel) so as to keep track of when each content is updated and to reduce the chances of overlapping the same acquisition of data. In the event that the data loader 130 goes down and must be rebooted, the information in the static file 140 can be retrieved and then the data in the journal file 142 can be rebuilt based on the last time it was refreshed. In addition, the information in the journal file 142 may be cleared out if it is not requested in a pre-defined amount of time, for example, every 24 hours.

Once content is retrieved from the content servers 150a, 150b, 150c, the translator 134 may convert the content into an extensible mark-up language (XML) format so that it may be easily presented on the electronic device 102. The data loader 130 may then write the updated content to each of the parallel cache servers 106a, 106b, 106c so that it is available the next time it is requested by the electronic device 102.

Figure 2:
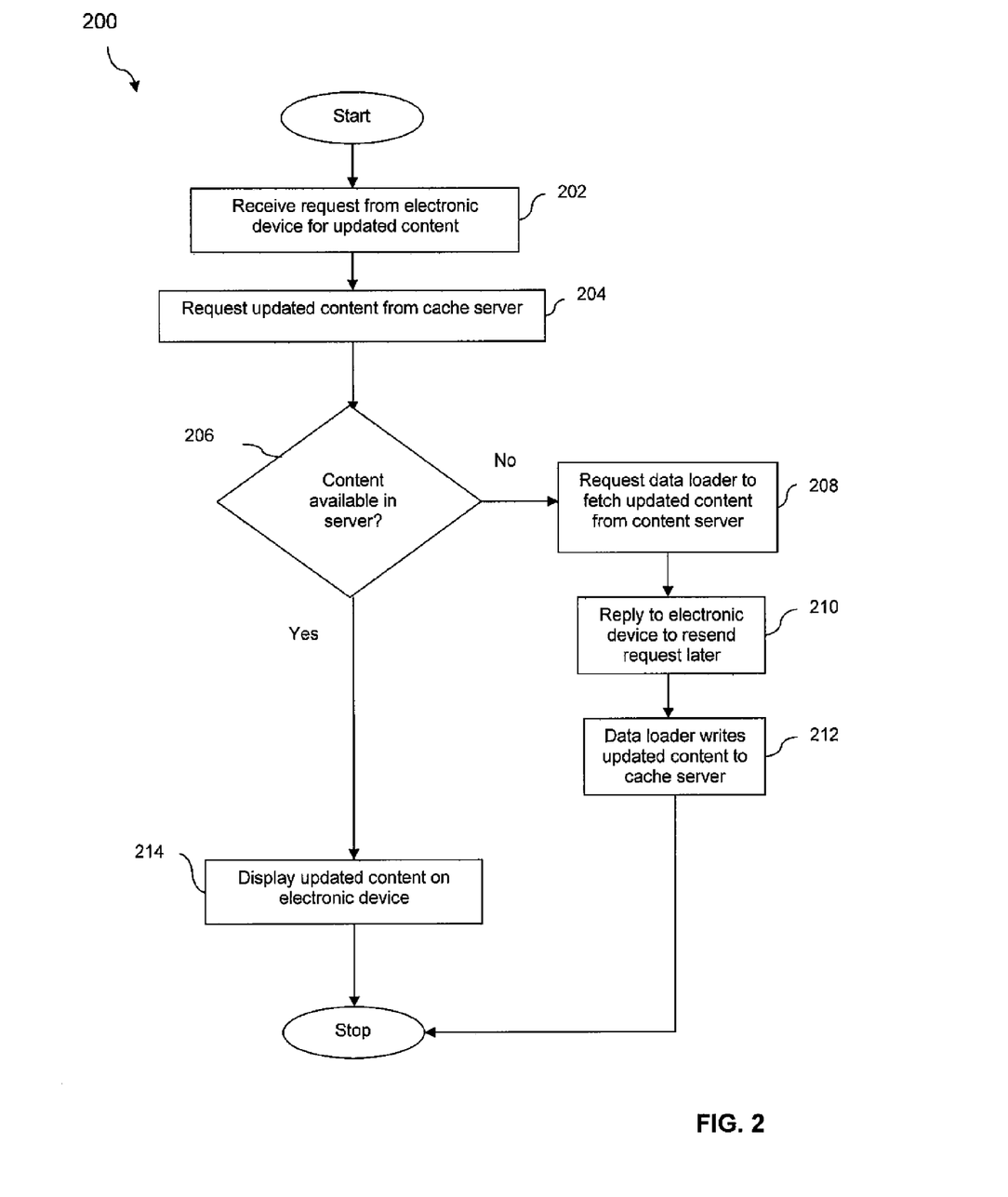
FIG. 2 illustrates a method of updating content according to an embodiment of the disclosure.

Turning now to FIG. 2, a method 200 for updating content using parallel cache servers is described. The method 200 begins at block 202 where the electronic device 102 communicates, via hypertext transport protocol (HTTP), to request updated content (e.g., a weather report, a weather forecast, a sports score, a stock price quote, a news headline) from one of the plurality of feed servers 104a, 104b, 104c. In block 204, one of the plurality of feed servers 104a, 104b, 104c may request the updated content from one of the plurality of parallel cache servers 106a, 106b, 106c, wherein each of the cache servers may contain substantially the same content. The content may be requested from one of the cache servers 106a, 106b, 106c using a round-robin selection process.

In block 206, if the requested content is available in one of the cache servers 106a, 106b, 106c, the method 200 moves directly to block 214 where the updated content is sent to display on the electronic device 102. If in block 206, the requested content is not available in any of the plurality of cache servers 106a, 106b, 106c, the method moves to block 208 where the feed servers 104a, 104b, 104c may then request that the data loader 130 fetch the updated content from one of the plurality of content servers 150a, 150b, 150c and to write the content to each of the cache servers 106a, 106b, 106c. In block 210, the feed servers 104a, 104b, 104c also may send a message back to the electronic device 102 that the content is not readily available and recommend resending the request at a later time. Moving to block 212, the data loader 130 begins fetching the updated content from the content servers 150a, 150b, 150c on a periodic basis and then writing the updated content to the cache servers 106a, 106b, 106c.

Figure 3:
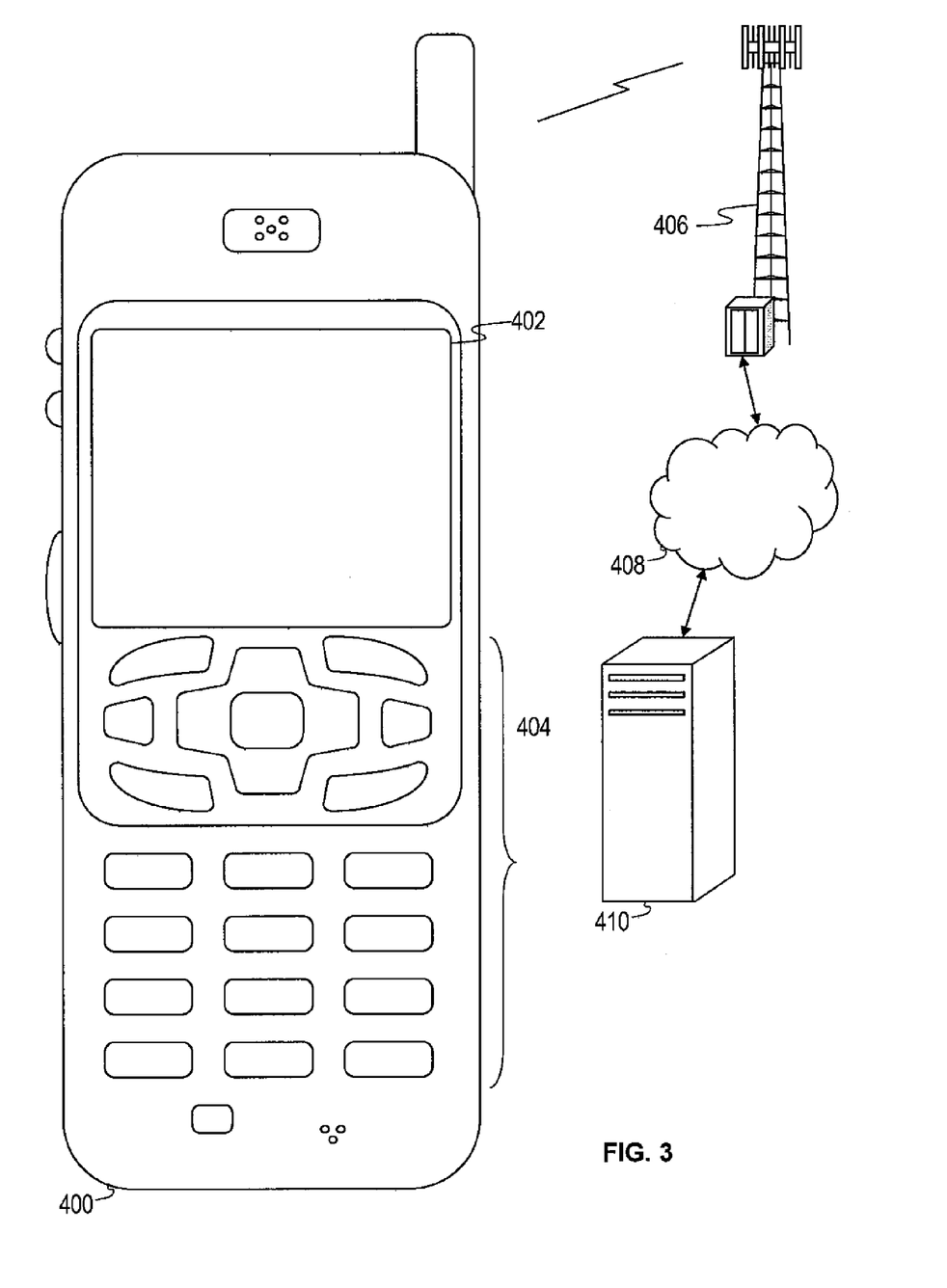
FIG. 3 illustrates a handset suitable for implementing an embodiment of the disclosure.

FIG. 3 shows a wireless communications system including the mobile device 400 which may be similar to the electronic device 102 in FIG. 1. FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 may be a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser or other application which enables the display 402 to present content. The content may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the Internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 4:
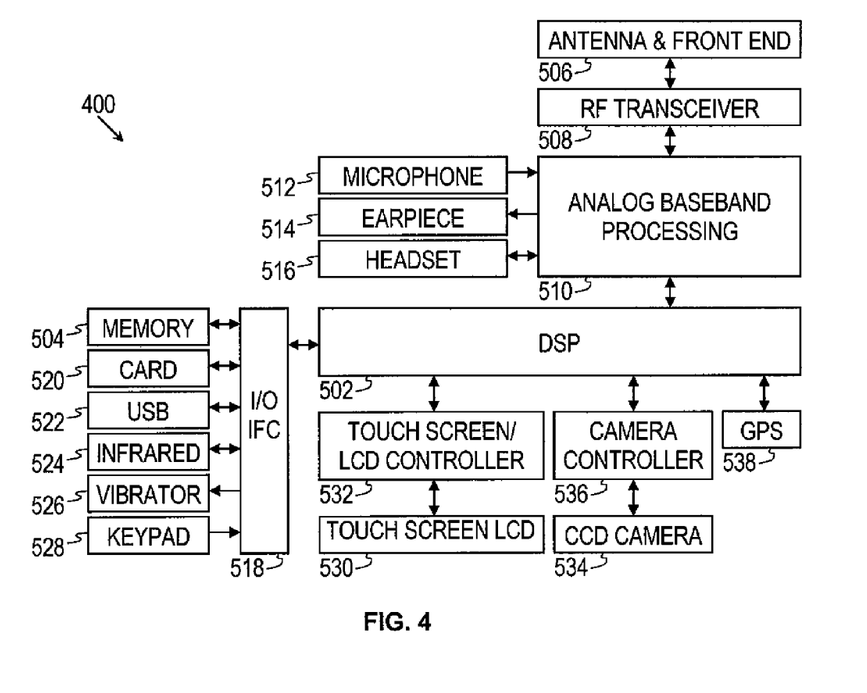
FIG. 4 is a block diagram of a handset suitable for implementing an embodiment of the disclosure.

FIG. 4 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 5:
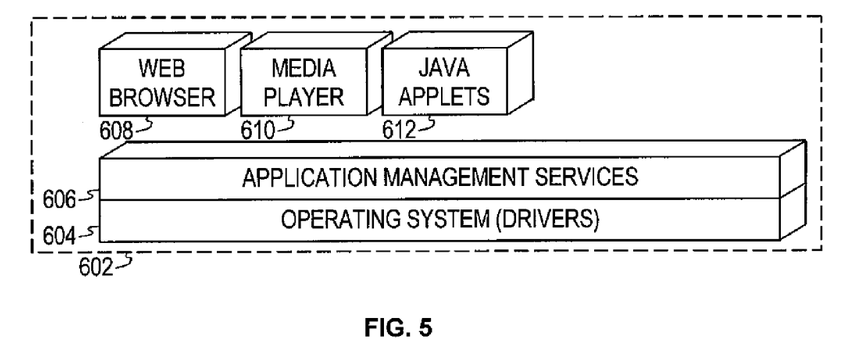
FIG. 5 is a block diagram of a software architecture of a handset suitable for implementing an embodiment of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 7 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 6:
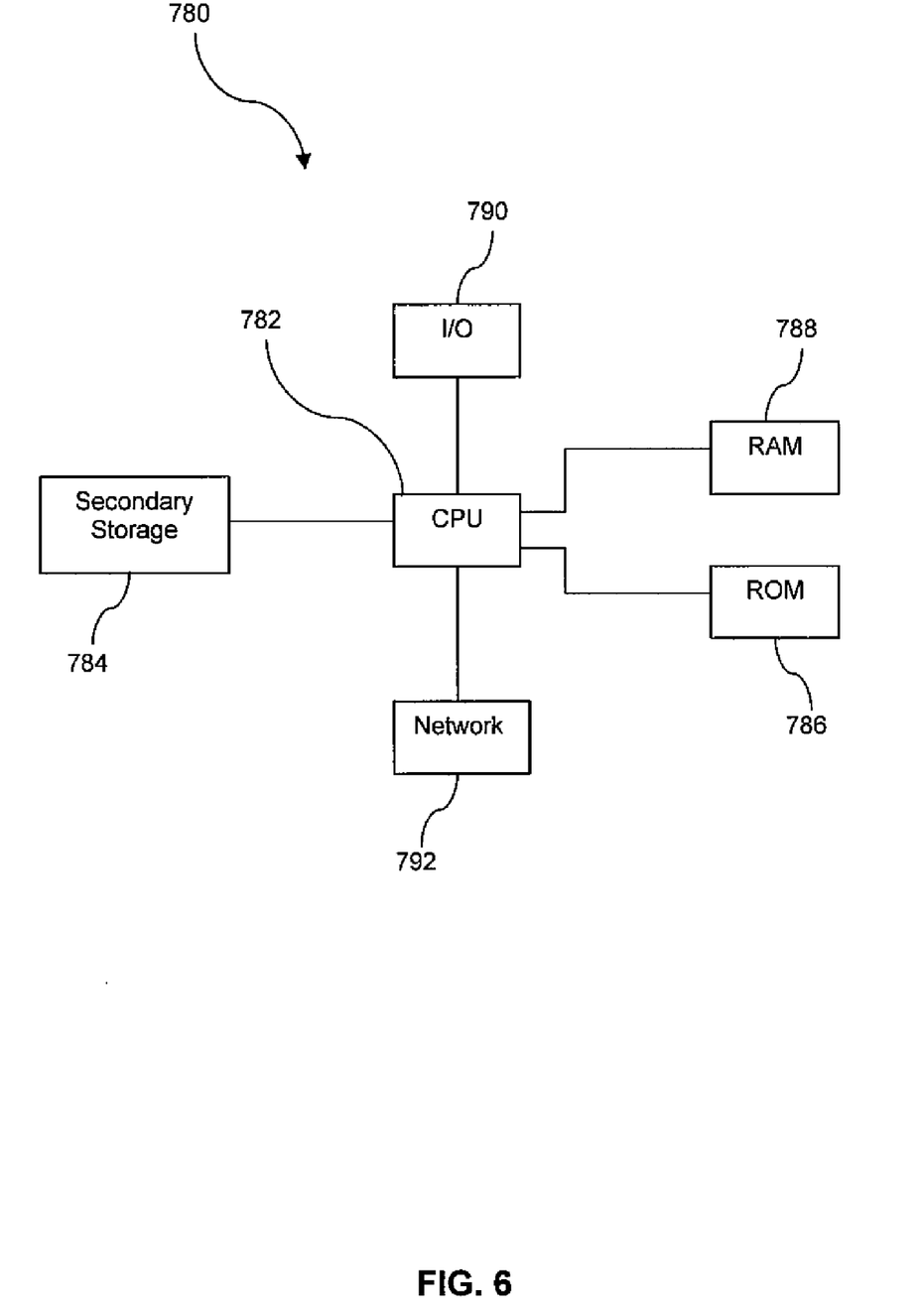
FIG. 6 illustrates an exemplary computer system suitable for implementing some aspects of the several embodiments of the disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used to store non-volatile data or over-flow data if RAM 388 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embodied in the carrier wave may be sequenced differently as desired for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system of content delivery, comprising:
   a plurality of content cache servers, each cache server storing a plurality of current content and sending requested content, where the current content is substantially the same at each of the cache servers;
   a plurality of data loaders, each data loader in communication with each of the content cache servers, each data loader to retrieve an updated content from a content source and to write the updated content to each of the content cache servers, the data loaders to schedule retrieving the updated content from the content source based on a file entry comprising a refresh period for the updated content, the data loaders to arbitrate periodically to prevent duplication of file entries; and
   a plurality of content feed servers, each feed server in communication with each of the content cache servers and each of the data loaders, each feed server to receive a request for content from an electronic device, to request the content from one of the content cache servers, and when the content cache server replies that the requested content is not available, to send the request for the content to one of the data loaders selected based on a round-robin selection process and to send a message to the electronic device to resend the request for content at a later time, wherein the message comprises the later time at which the electronic device is to resend the request for content.

2. The system of claim 1, wherein the data loaders arbitrate file entries comprising the refresh period by sending copies of the file entries to each of the data loaders and expunging duplicate file entries.

3. The system of claim 1, where when the content cache server replies that the requested content is not available, the content feed server waits to receive a synchronous reply from the data loader containing the requested updated content and sends the updated content to the electronic device.

4. The system of claim 1, wherein the requested content comprises one of a stock quote, a weather report, a weather forecast, a sports score, and a news headline.

5. The system of claim 1, wherein the electronic device is one of a mobile phone, a personal digital assistant (PDA), and a media player.

6. A method of updating content, comprising:
fetching, by each of a plurality of data loaders, updated content from a content server;
writing, by each of the plurality of data loaders, the updated content to each of the plurality of cache servers, wherein the plurality of data loaders schedule retrieving the updated content from the content server based on a file entry comprising a refresh period for the updated content, and wherein the plurality of data loaders arbitrate periodically to prevent duplication of file entries;
receiving, by one of a plurality of content feed servers, a request to send content from an electronic device;
requesting, by the one of the plurality of content feed servers, the content from one of a plurality of cache servers, wherein each of the plurality of cache servers stores a plurality of current content and sends requested content, and wherein the current content is substantially the same at each of the plurality of cache servers; and
when the requested updated content is not present in the one of the plurality of cache servers, sending, by the one of the plurality of content feed servers, a message to the electronic device to resend the request at a later time, wherein the message comprises the later time at which the electronic device is to resend the request for content.

7. The method of claim 6, wherein the electronic device is one of a mobile phone, a personal digital assistant (PDA), and a media player.

8. The method of claim 6, wherein the request to send content is for receiving a really simple syndication (RSS) content feed.

9. The method of claim 6, wherein requesting the content from the one of the plurality of cache servers comprises selecting the one of the plurality of cache servers using a round-robin selection process.

10. The method of claim 6, wherein the content comprises one or more of sports scores, current weather conditions, weather forecasts, stock quotes, and news headlines.

11. The method of claim 6, wherein each of the plurality of data loaders stops fetching the updated content from the content server periodically after a pre-defined length of time.

12. A system of content delivery, comprising:
a plurality of content cache servers, each cache server storing a plurality of current content and sending requested content, where the current content is substantially the same at each of the cache servers;
a plurality of data loaders, each data loader in communication with each of the content cache servers, each data loader to retrieve an updated content from a content source and to write the updated content to each of the content cache servers, the data loaders to schedule retrieving the updated content from the content source based on a file entry comprising a refresh period for the updated content, the data loaders to arbitrate periodically to prevent duplication of file entries; and
a plurality of content feed servers, each feed server in communication with each of the content cache servers and each of the data loaders, each feed server to receive a request for content from an electronic device, to request the content from one of the content cache servers, and when the content cache server replies that the requested content is not available, to send the request for the content to one of the data loaders selected based on a universal reference locator (URL) of the requested content and to send a message to the electronic device to resend the request for content at a later time, wherein the message comprises the later time at which the electronic device is to resend the request for content.

13. The system of claim 12, wherein the content feed servers communicate with the electronic device using hypertext transport protocol (HTTP).

14. The system of claim 12, wherein each data loader comprises an at least one file listing a plurality of universal reference locators and associated update intervals, wherein the data loader retrieves updated content from the content sources identified by the universal reference locators at times based on the update intervals.

15. The system of claim 14, wherein the data loader comprises a first file listing a first plurality of universal reference locators and associated update intervals, where the first universal reference locators do not change based on location and a second file listing a second plurality of universal reference locators and associated update intervals, where the second universal reference locators change based on location.

16. The system of claim 15, wherein the data loaders use the first file and second file to resume periodic retrieval of updated content from the content sources after the data loader is rebooted.

17. The system of claim 12, wherein each data loader translates the updated content into an extensible mark-up language format before writing the updated content to each of the content cache servers.

18. The system of claim 17, wherein the electronic device is one of a mobile phone, a personal digital assistant (PDA), and a media player, and wherein the updated content in extensible mark-up language format promotes the electronic device presenting the updated content.

* * * * *